United States Patent
Niemirska et al.

(10) Patent No.: US 10,638,201 B2
(45) Date of Patent: Apr. 28, 2020

(54) SYSTEMS AND METHODS FOR AUTOMATICALLY DETERMINING LANGUAGE SETTINGS FOR A MEDIA ASSET

(71) Applicant: Rovi Guides, Inc., San Jose, CA (US)

(72) Inventors: Ula Niemirska, Sokolow Podlaski (PL); Charles Dawes, Ryton (GB)

(73) Assignee: Rovi Guides, Inc., San Jose, CA (US)

( * ) Notice: Subject to any disclaimer, the term of this patent is extended or adjusted under 35 U.S.C. 154(b) by 23 days.

(21) Appl. No.: 16/142,762

(22) Filed: Sep. 26, 2018

(65) Prior Publication Data
US 2020/0099989 A1 Mar. 26, 2020

(51) Int. Cl.
*H04N 21/488* (2011.01)
*G06F 17/28* (2006.01)
*G06F 3/16* (2006.01)
*H04N 21/45* (2011.01)

(52) U.S. Cl.
CPC ......... *H04N 21/4884* (2013.01); *G06F 3/165* (2013.01); *G06F 17/28* (2013.01); *H04N 21/4532* (2013.01)

(58) Field of Classification Search
CPC .............................................. H04N 21/4884; H04N 21/4532; G06F 3/165; G06F 17/28
See application file for complete search history.

(56) References Cited

U.S. PATENT DOCUMENTS

| 5,469,370 | A | 11/1995 | Ostrover et al. |
| 7,051,360 | B1 * | 5/2006 | Ellis ................... H04N 5/44543 725/136 |
| 7,761,892 | B2 | 7/2010 | Ellis et al. |
| 8,046,801 | B2 | 10/2011 | Ellis et al. |
| 8,805,668 | B2 * | 8/2014 | Bangalore ............. G06F 17/289 704/2 |
| 9,201,627 | B2 | 12/2015 | Tam et al. |
| 9,324,365 | B2 * | 4/2016 | Hametner ........ G11B 20/10527 |
| 9,571,870 | B1 * | 2/2017 | Wilson ............... H04N 21/4722 |
| 9,854,324 | B1 | 12/2017 | Panchaksharaiah et al. |
| 2004/0152054 | A1 | 8/2004 | Gleissner et al. |
| 2005/0251827 | A1 | 11/2005 | Ellis et al. |
| 2011/0069940 | A1 | 3/2011 | Shimy et al. |
| 2011/0164175 | A1 * | 7/2011 | Chung ............... H04N 21/4126 348/468 |
| 2011/0167447 | A1 | 7/2011 | Wong |
| 2012/0105720 | A1 | 5/2012 | Chung et al. |
| 2012/0114303 | A1 | 5/2012 | Chung et al. |

(Continued)

*Primary Examiner* — Junior O Mendoza
(74) *Attorney, Agent, or Firm* — Haley Guiliano LLP

(57) ABSTRACT

Systems and methods for automatically determining language settings for a media asset are disclosed herein. A system receives a selection of a media asset and determines whether the media asset is available to be presented in a plurality of audio languages and subtitle languages. In response to determining that the media asset is available to be presented in a plurality of audio languages and subtitle languages, the system retrieves a first profile indicating a first recent experience based on a first number of meetings scheduled within a time period. Based on the first recent experience, the system selects an audio language and a subtitle language for presentation of the media asset. The system presents the media asset using the selected audio language and subtitle language.

20 Claims, 8 Drawing Sheets

(56) References Cited

U.S. PATENT DOCUMENTS

| | | |
|---|---|---|
| 2013/0173034 A1 | 7/2013 | Reimann et al. |
| 2015/0304727 A1* | 10/2015 | Vandichalrajan .. H04N 21/2343 725/40 |
| 2017/0025116 A1 | 1/2017 | Mehra |
| 2017/0182283 A1 | 6/2017 | Palmateer et al. |
| 2018/0220195 A1 | 8/2018 | Panchaksharaiah et al. |

* cited by examiner

500

USER PROFILES

| USER ID | NO. MEETINGS TODAY | PRIMARY LANGUAGE | PROFICIENCY LEVEL | SECONDARY LANGUAGE | PROFICIENCY LEVEL | TERTIARY LANGUAGE | PROFICIENCY LEVEL |
|---|---|---|---|---|---|---|---|
| 12432 | 2 | ENGLISH | 10 | SPANISH | 6 | N/A | N/A |
| 13414 | 8 | ENGLISH | 9 | N/A | N/A | N/A | N/A |
| 20432 | 6 | SPANISH | 10 | ENGLISH | 8 | FRENCH | 4 |

FIG. 5

700 Media Asset Language Availability

| Media Assest ID (702) | Audio Language(s) (704) | Dubbing Language(s) (706) | Mirror Dubbing Language(s) (708) | Subtitle Language(s) (710) |
|---|---|---|---|---|
| 1235 | English, Spanish | English, Spanish, French | English, Spanish, French | English, Spanish |
| 4321 | Polish, English | Polish, English | Polish, English | Polish, English, Spanish |
| 5332 | English | N/A | N/A | Spanish |

712 — row 1235
714 — row 4321
716 — row 5332

FIG. 7

SYSTEMS AND METHODS FOR AUTOMATICALLY DETERMINING LANGUAGE SETTINGS FOR A MEDIA ASSET

BACKGROUND

The present disclosure relates to systems for presenting media assets, such as audio/video content, and more particularly to systems and related processes for automatically determining language settings for a media asset based on media asset language availability, a viewer's language proficiency, and other factors.

SUMMARY

Although present systems allow viewers who understand multiple languages to set a default set of language options for their content viewing, including the language of the audio stream and the language of any subtitles, such settings are often buried deep in the menu system. This is inflexible and doesn't offer the viewer the ability to easily match their viewing options with how they feel or want to consume content at a particular time. It would be desirable to have a system that enhances the experience by automatically providing the most appropriate combination for the viewer based on their ability to understand content, their mood, and with whom, if anyone, they are consuming entertainment.

In view of the foregoing, the present disclosure provides systems and related processes that determine the languages (e.g., audio languages, subtitle languages, dubbing languages, and/or the like) in which a media asset is available to be presented and automatically select the language(s) in which to present the media asset, based on both user-derived settings, such as language proficiencies, and automatically derived settings, such as a viewer's meeting schedule, which is an indicator of the viewer's mood. In this manner, if a viewer has had a busy day of meetings and thus does not wish to expend much effort in consuming the media asset in a secondary language, the media asset can automatically be presented to the viewer in their native language. If, on the other hand, the viewer has had an easy day without many meetings, as ascertained from the viewer's meeting schedule, and the viewer would thus desire to consume the media asset in a secondary language in which the viewer is trying to increase proficiency, the media asset can automatically be presented to the viewer in that secondary language.

In one aspect, the present disclosure provides an illustrative method for automatically determining language settings in which to present a media asset selected for viewing by a viewer. For example, the viewer may select a television program via a media program guide provided by way of the viewer's television or smartphone. Upon selection of the media asset, the system determines whether the media asset is available to be presented in multiple audio languages, subtitle languages, dubbing languages, and/or the like. If the media asset is available to be presented in multiple audio languages and subtitle languages, the system retrieves a profile, which is unique to the viewer and in which the viewer has previously entered personal information, such as languages in which the viewer has proficiency and the proficiency levels of such languages. The profile also includes a recent experience data field that the system automatically populates with recent experience information obtained by accessing the viewer's electronically accessible schedule(s). The recent experience data, for example, may indicate a number of meetings the viewer had scheduled within a time period (e.g., within the present day). In some examples, the system determines the number of meetings the viewer had scheduled within the time period based on a software calendar and stores that number of scheduled meetings in the viewer's profile. The system uses the recent experience data (i.e., the number of meetings scheduled for that day) to infer the viewer's willingness to be challenged that day by consuming audio/video content a non-native language. Based on the recent experience, the system automatically selects an audio language and, if warranted, a subtitle language and/or a dubbing language in which to present the media asset. The system presents the media asset in the selected language(s).

As mentioned above, the viewer profile indicates the viewer's language proficiency levels. For example, the viewer profile may indicate the viewer's primary language and the viewer's proficiency in that primary language. The viewer profile may also indicate the viewer's secondary language, if any, and the viewer's proficiency in that secondary language, which is likely inferior to the viewer's proficiency in the primary language. In such an example, the system may select the audio language and subtitle language based on a comparison of the proficiency levels in the primary and secondary languages. For instance, the system may determine, based on the viewer profile, whether the number of meetings the viewer had scheduled that day exceeds some predetermined threshold. If so, the system may select an audio language, a subtitle language, and/or a dubbing language in the primary language if available for that media asset. If, on the other hand, the number of meetings the viewer had scheduled that day does not exceed the threshold, the system may select an audio language, subtitle language, and/or dubbing language in a secondary language, if available, with which the viewer has at least some proficiency.

As another example, if the number of meetings the viewer had scheduled that day does not exceed the threshold, the system may determine whether the viewer's proficiency in their secondary language exceeds a separate proficiency threshold. If not, then the system may select the secondary language as the audio language in which to present the media asset, in combination with a subtitle language in the viewer's primary language. In this manner, if the viewer has not had a busy day, the viewer may experience the audio/video content in their secondary language, with the assistance of subtitles in their primary language.

In some instances, the viewer may be viewing the content together with another viewer who has their own language proficiencies in their own viewer profile stored by the system. In such an instance, the system may automatically determine, based not only on the languages in which the media asset is available to be presented, but also on the language proficiencies and recent experiences of both viewers, which language(s) in which to present the media asset. For example, the system may retrieve a second viewer profile indicating the number of meetings the second viewer had scheduled that day and the second viewer's language proficiencies. The system may then determine whether the respective numbers of meetings the first and second viewers had scheduled that day exceed the predetermined threshold. If the number of meetings for the first viewer falls below the threshold but the number of meetings for the second viewer exceeds the threshold, the system may select an audio language, subtitle language, and/or dubbing language based on the primary language shared in common by both viewers. In this manner, even though the first viewer may be willing to view the media asset in their secondary language, the system uses the primary language to satisfy the second user.

In yet another example, where a viewer has at least some proficiency in three or more languages, the system may use proficiency level thresholds to automatically determine the language settings most suitable for the circumstances. For example, if the number of meetings a viewer had on a given day falls below a predetermined meeting threshold, the system may determine whether the viewer's proficiency level in their secondary language is at least as high as a predetermined proficiency threshold. If not, the system may select the secondary language as the audio language, and then determine how far below the proficiency threshold the viewer's proficiency is in that secondary language to determine whether to present subtitles in a primary language or a tertiary language. If the viewer's proficiency in the secondary language is considered too weak, then the system may select the primary language as the subtitle language, so as not to excessively burden the viewer. If, on the other hand, the user's proficiency is the secondary language is considered strong, then the system may select the tertiary language as the subtitle language, to provide the viewer with an opportunity to gain proficiency in the tertiary language.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative example of a user profile, in accordance with some embodiments of the disclosure;

FIG. 7 shows an illustrative example of a media asset language availability table, in accordance with some embodiments of the disclosure.

DETAILED DESCRIPTION

Figure 1:
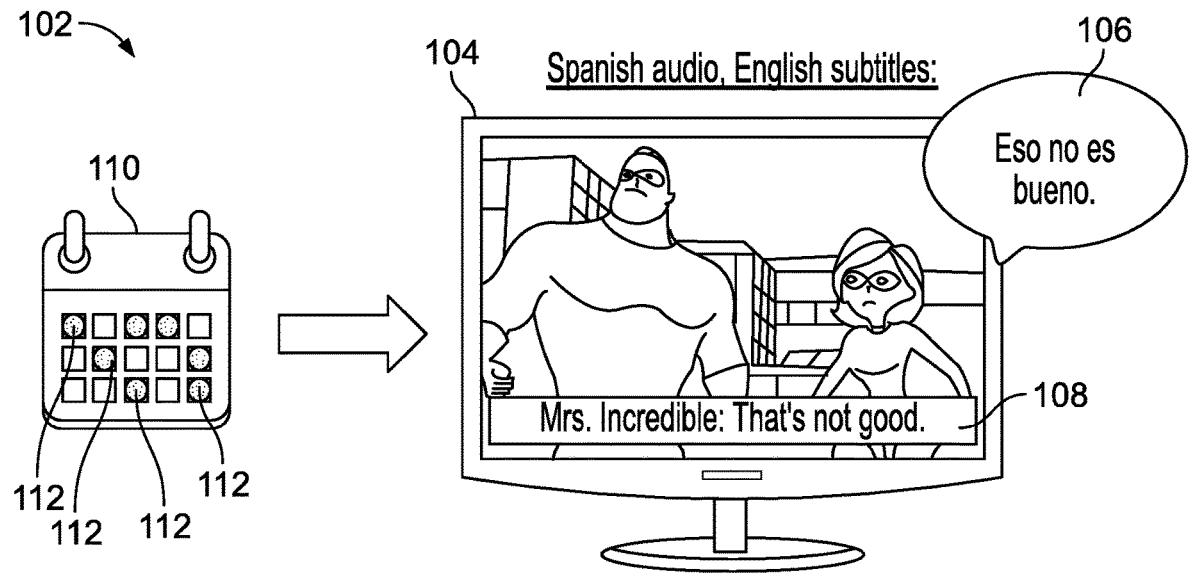
FIG. 1 shows an illustrative example of automatically determining language settings for a media asset, in accordance with some embodiments of the disclosure.
Figure 1:
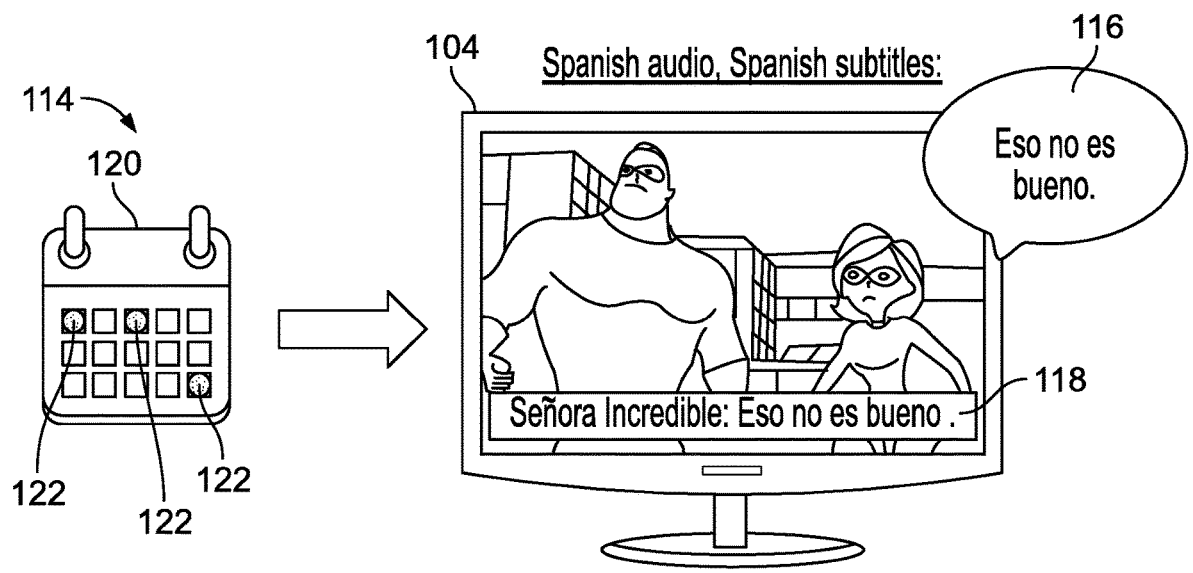

FIG. 1 shows illustrative scenarios of automatically determining language settings for a media asset, in accordance with some embodiments of the disclosure. In particular, diagrams 102 and 114 illustrate two scenarios, occurring on two different days, in which different language settings are automatically selected based on a viewer's meeting schedule on the given day. In both the scenario of diagram 102 and the scenario of diagram 114, the media asset is presented via a display 104 using the viewer's secondary language (Spanish) as the audio language 106, 116. However, in the scenario of diagram 102, based on an indication in the viewer's meeting schedule 110 for that day that the viewer had a busy day of meetings 112, the media asset is also presented by way of subtitles 108 in the viewer's primary language (English). In the scenario of diagram 114, based on an indication in the viewer's meeting schedule 120 for that day that the viewer had a lighter day of meetings 122, the media asset is presented using the viewer's secondary language (Spanish) as the subtitle language 118. In this manner, on the day when the viewer had a busy day of meetings and thus does not wish to expend much effort in consuming the media asset, the viewer can be provided with subtitles in their native language for ease of consumption. Likewise, on the day when the viewer did not have a busy day of meetings and would be willing to expend more effort in consuming the media asset in the secondary language they wish to learn, the viewer can be presented with subtitles in their secondary language. The systems and related processes herein thus enhance the viewer's experience by automatically providing content in the most appropriate language(s) for the viewer based on their ability to understand content, their mood, and with whom, if anyone, they are consuming entertainment. The present systems and processes also provide improved flexibility over static language settings, which are often buried deep in a menu system, and offer the viewer the ability to easily match their viewing options with how they feel or want to consume content at a particular time.

Figure 2:
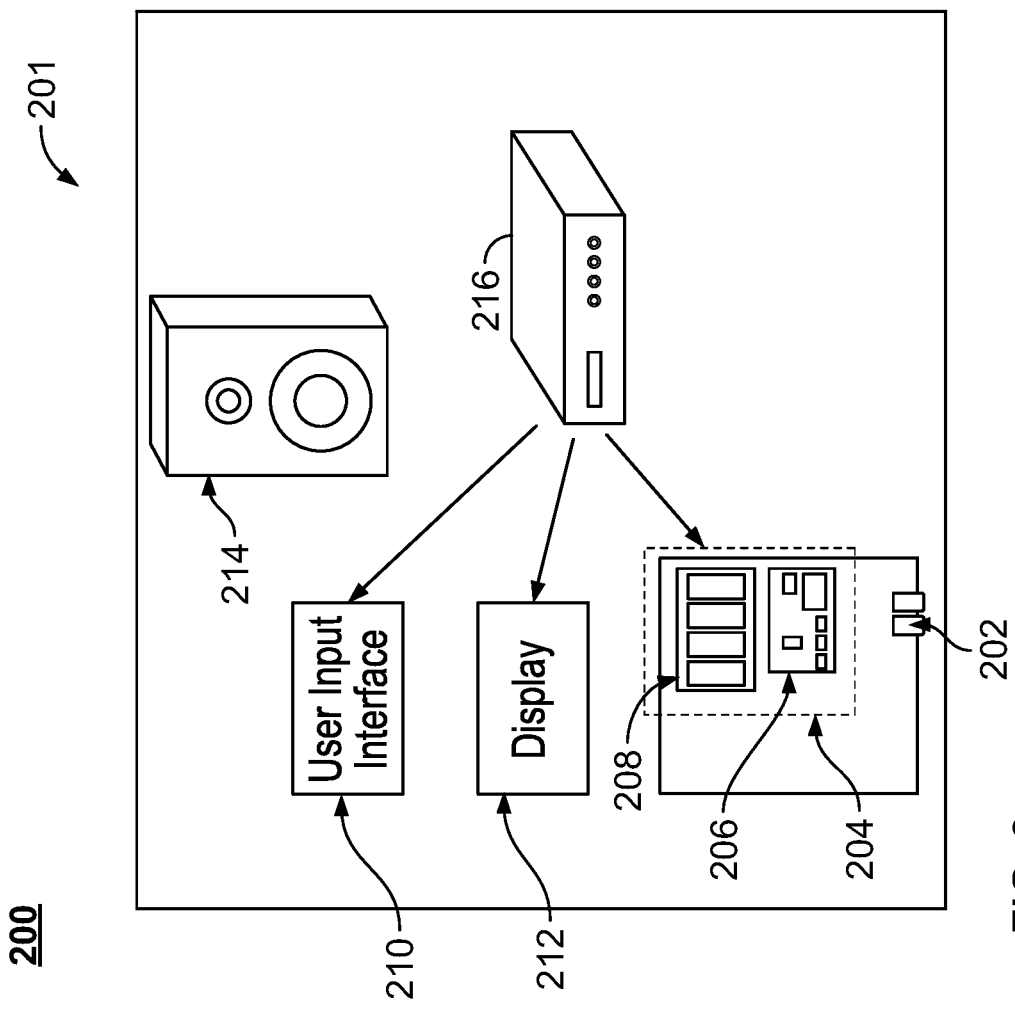
FIG. 2 is a block diagram of an illustrative user equipment device in accordance with some embodiments of the disclosure.
Figure 2:
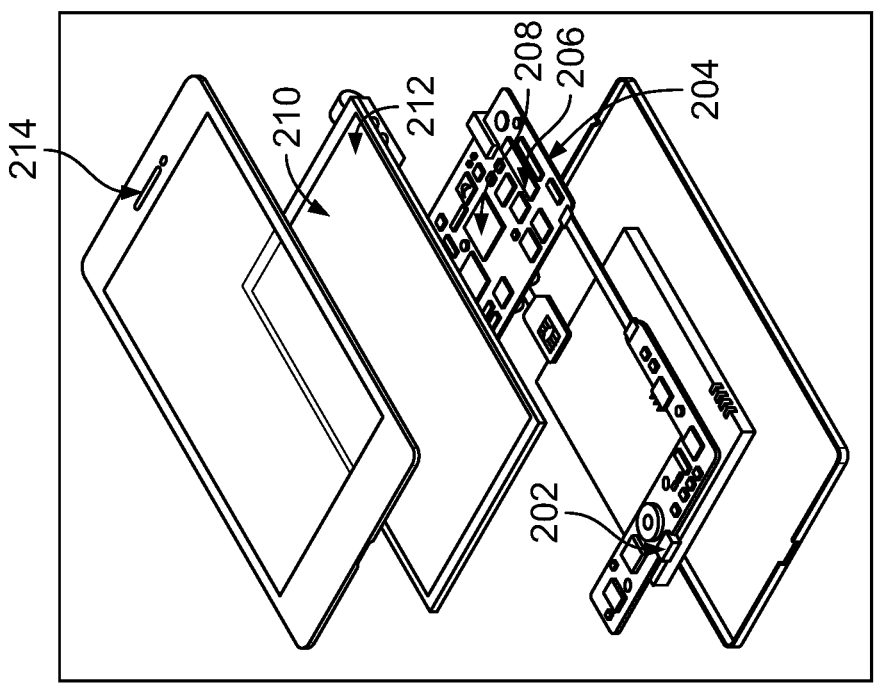

Having described illustrative scenarios for automatically determining language settings for a media asset, reference is now made to FIG. 2, which shows generalized embodiments of an illustrative user equipment device 200 and an illustrative user equipment system 201, either of which may be employed in accordance with various embodiments herein. For example, the user equipment device 200 may be a smartphone device or a remote control. In another example, user equipment system 201 may be a user television equipment system. User television equipment system 201 may include a set-top box 216. Set-top box 216 may be communicatively connected to speaker 214 and display 212. In some embodiments, display 212 may be a television display or a computer display. In some embodiments, set-top box 216 may be communicatively connected to user input interface 210. In some embodiments, user input interface 210 may be a remote control device. Set-top box 216 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of user equipment devices are discussed below in connection with FIG. 3. Each one of user equipment device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 204 executes instructions for an application stored in memory (e.g., storage 208). Specifically, control circuitry 204 may be instructed by the application to perform the functions discussed above and below. For example, the application may provide instructions to control circuitry 204 to generate the media guidance displays. In some implementations, any action performed by control circuitry 204 may be based on instructions received from the application.

In client/server-based embodiments, control circuitry 204 may include communications circuitry suitable for communicating with an application server or other networks or servers. The instructions for carrying out the above-mentioned functionality may be stored on the application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video-generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of each one of user equipment device 200 and user equipment system 201 or may be stand-alone units. The audio component of videos and other content displayed on display 212 may be played through speakers 214. In some embodiments, the audio may be distributed to a receiver (not shown), which processes and outputs the audio via speakers 214.

The application may be implemented using any suitable architecture. For example, it may be a stand-alone application wholly implemented on each one of user equipment device 200 and user equipment system 201. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

In some embodiments, the application is a client/server-based application. Data for use by a thick or thin client implemented on each one of user equipment device 200 and user equipment system 201 is retrieved on demand by issuing requests to a server remote to each one of user equipment device 200 and user equipment system 201. In one example of a client/server-based application, control circuitry 204 runs a web browser that interprets web pages provided by a remote server. For example, the remote server may store the instructions for the application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the application corresponding to the input (e.g., a display that moves a cursor up/down). The generated display is then transmitted to equipment device 200 for presentation to the user.

In some embodiments, the application is downloaded and interpreted or otherwise run by an interpreter or virtual machine (run by control circuitry 204). In some embodiments, the application may be encoded in the ETV Binary Interchange Format (EBIF), received by control circuitry 204 as part of a suitable feed, and interpreted by a user agent running on control circuitry 204. For example, the application may be an EBIF application. In some embodiments, the application may be defined by a series of JAVA-based files that are received and run by a local virtual machine or other suitable middleware executed by control circuitry 204. In some of such embodiments (e.g., those employing MPEG-2 or other digital media encoding schemes), the application may be, for example, encoded and transmitted in an MPEG-2 object carousel with the MPEG audio and video packets of a program.

Figure 3:
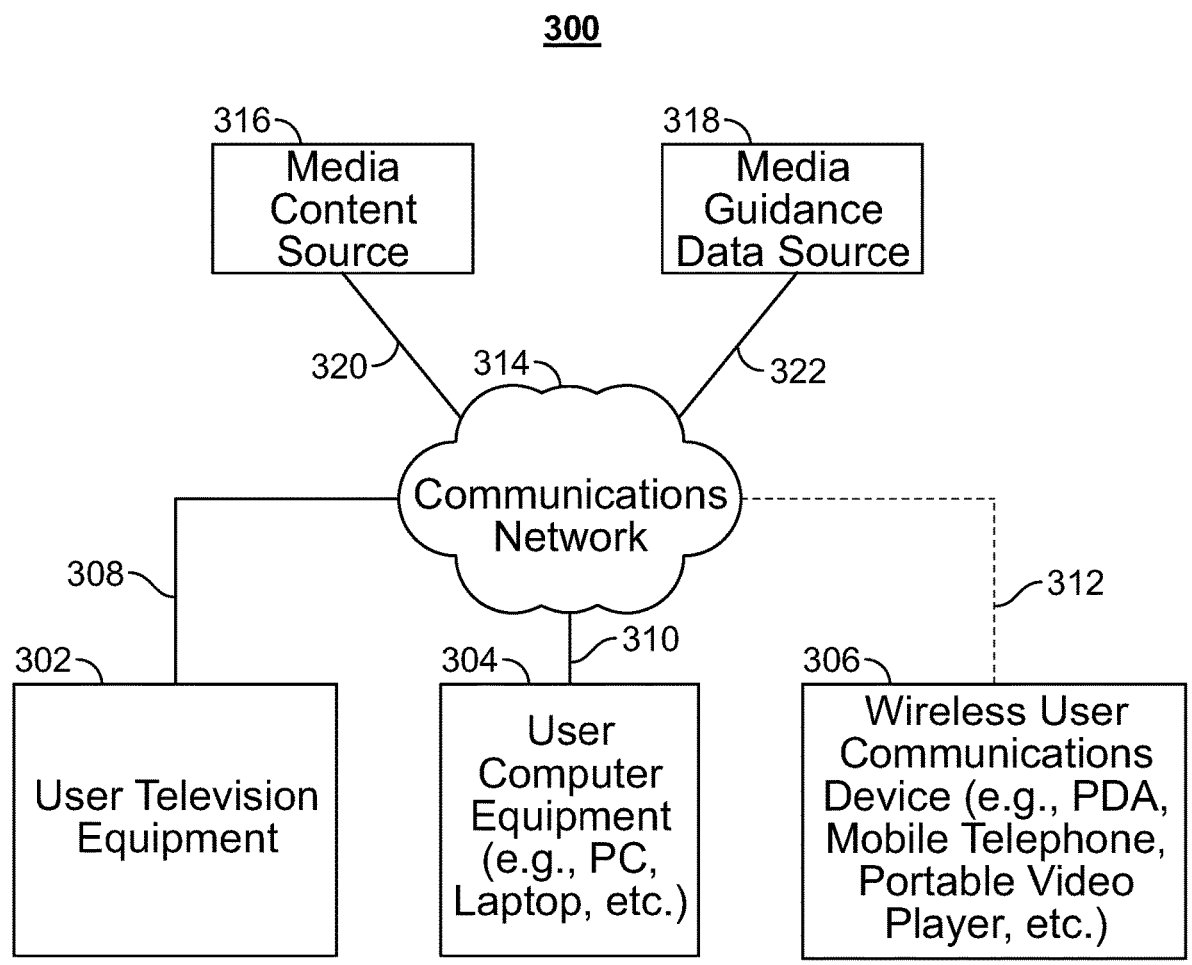
FIG. 3 is a block diagram of an illustrative media system in accordance with some embodiments of the disclosure.

Each one of user equipment device 200 and user equipment system 201 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which an application may be implemented, may function as stand-alone devices or may be part of a network of devices. Various network configurations of devices may be implemented and are discussed in more detail below.

A user equipment device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The application may have the same layout on various different types of user equipment or may be tailored to the display capabilities of the user equipment. For example, on user computer equipment 304, the application may be provided as a website accessed by a web browser. In another example, the application may be scaled down for wireless user communications devices 306.

In system 300, there is typically more than one of each type of user equipment device but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent application settings across in-home devices and remote devices. Settings include those described herein, such as language settings, and other desirable guidance settings. For example, if a user sets language settings, such as language proficiency levels for particular languages, on their personal computer at their office, for example, the same language settings would appear on the user's in-home devices (e.g., user television equipment and user computer equipment) as well as the user's mobile devices, if desired. Therefore, changes made on one user equipment device can change the experience on another user equipment device, regardless of whether they are the same or a different type of user equipment device. In addition, the changes made may be based on settings input by a user, as well as user activity monitored by the application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path, and paths 308 and 310 are drawn as solid lines to indicate they are wired paths (although these paths may be wireless paths, if desired). Communications with the user equipment devices may be provided by one or more of these communications paths but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 402-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes content source 316 and media guidance data source 318 coupled to communications network 314 via communication paths 320 and 322, respectively. Paths 320 and 322 may include any of the communication paths described above in connection with paths 308, 310, and 312. Communications with the content source 316 and media guidance data source 318 may be exchanged over one or more communications paths but are shown as a single path in FIG. 3 to avoid overcomplicating the drawing. In addition, there may be more than one of each of content source 316 and media guidance data source 318, but only one of each is shown in FIG. 3 to avoid overcomplicating the drawing. (The different types of each of these sources are discussed below.) If desired, content source 316 and media guidance data source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312.

Content source 316 may include one or more types of content distribution equipment, including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 318 may provide media guidance data, such as the media guidance data described above. Media guidance data may be provided to the user equipment devices using any suitable approach. In some embodiments, the application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access.

Applications may be, for example, stand-alone applications implemented on user equipment devices. For example, the application may be implemented as software or a set of executable instructions which may be stored in storage 208 and executed by control circuitry 204 of each one of user equipment device 200 and user equipment system 201. In some embodiments, applications may be client/server applications where only a client application resides on the user equipment device, and a server or the application resides on a remote server. For example, applications may be implemented partially as a client application on control circuitry 204 of each one of user equipment device 200 and user equipment system 201 and partially on a remote server as a server application (e.g., media guidance data source 318) running on control circuitry of the remote server. When executed by control circuitry of the remote server (such as media guidance data source 318), the application may instruct the control circuitry to generate the application displays and transmit the generated displays to the user equipment devices. The server application may instruct the control circuitry of the media guidance data source 318 to transmit data for storage on the user equipment. The client application may instruct control circuitry of the receiving user equipment to generate the application displays.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YOUTUBE is a trademark owned by Google Inc., NETFLIX is a trademark owned by Netflix Inc., and HULU is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on the user equipment device.

Media guidance system 300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3.

In one approach, user equipment devices may communicate with each other within a home network. User equipment devices can communicate with each other directly via short-range point-to-point communication schemes described above, via indirect paths through a hub or other similar device provided on a home network, or via communications network 314. Each of the multiple individuals in a single home may operate different user equipment devices on the home network. As a result, it may be desirable for various information or settings, such as language settings, to be communicated between the different user equipment devices. For example, it may be desirable for users to maintain consistent application settings on different user equipment devices within a home network, as described in greater detail in Ellis et al., U.S. Patent Publication No. 2005/0251827, filed Jul. 11, 2005, which is hereby incorporated by reference herein in its entirety. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., language settings, recordings, reminders, or other settings) on the online application to control the user's in-home equipment. The online guide may control the user's equipment directly, or by communicating with an application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their application to communicate directly with content source 316 to access content. Specifically, within a home, users of user television equipment 302 and user computer equipment 304 may access the application to navigate among and locate desirable content. Users may also access the application outside of the home using wireless user communications devices 306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more media guidance data sources 318. In addition or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

Cloud resources may be accessed by a user equipment device using, for example, a web browser, an application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

Figure 4:
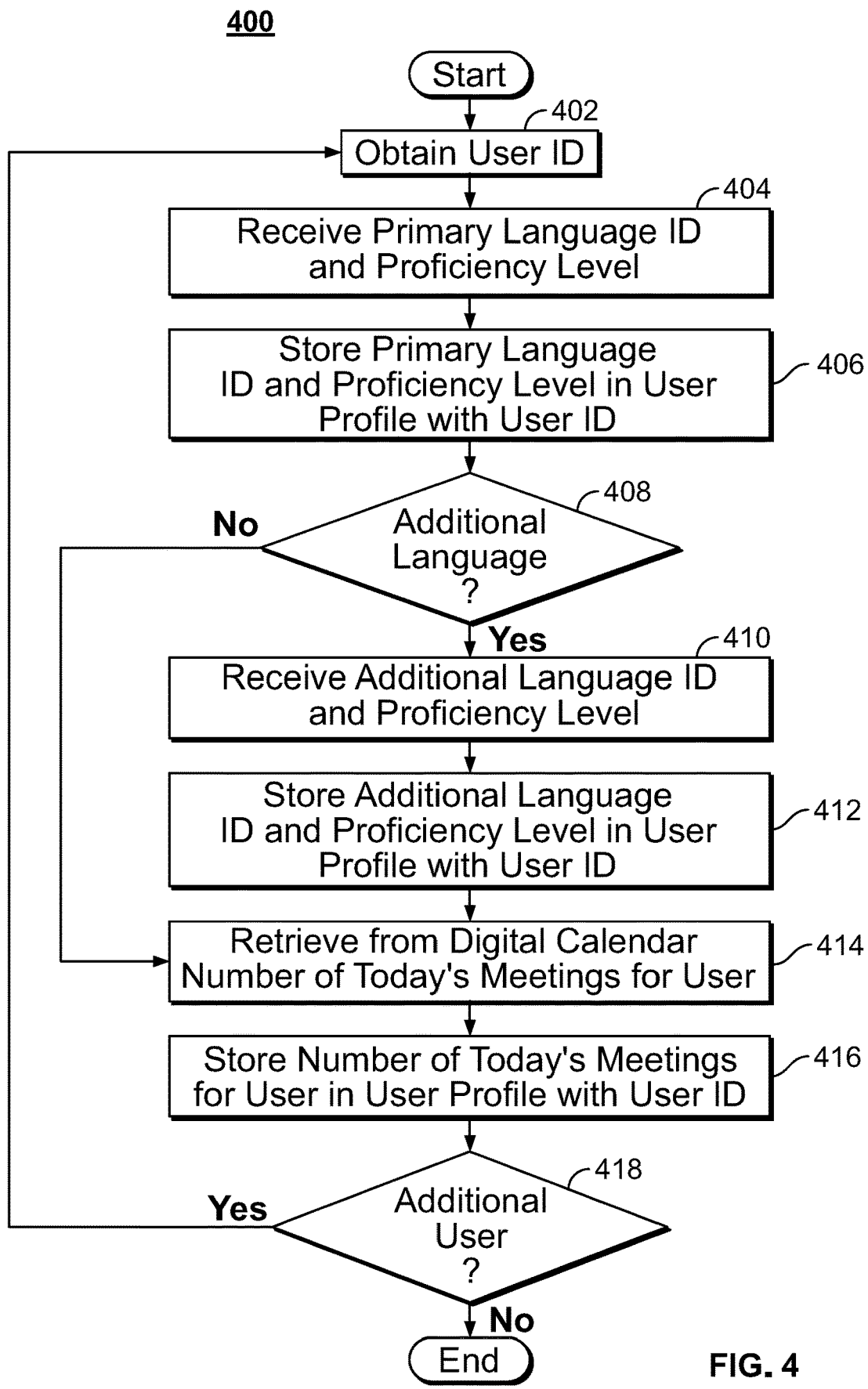
FIG. 4 depicts an illustrative flowchart of a process for generating a user profile, such as the user profile shown in FIG. 5, in accordance with some embodiments of the disclosure.

Reference is now made to FIG. 4, which depicts an illustrative flowchart of a process 400 for generating a user profile, such as the user profile 500 shown in FIG. 5, in accordance with some embodiments of the disclosure. At block 402, control circuitry 204 obtains a user identifier corresponding to a viewer who is presently logged on to their viewer account registered with user equipment device 200 or user equipment system 201. Control circuitry 204 may be configured to retrieve the user identifier from storage 208 automatically upon power being applied to the user equipment device 200 or user equipment system 201. Additionally or alternatively, control circuitry 204 may be configured to retrieve the user identifier from storage 208 in response to the viewer's logging on to their account via user equipment device 200 or user equipment system 201.

At block 404, control circuitry 204 receives an identifier of a primary language for the viewer and the viewer's proficiency level in that primary language. For example, the viewer may input their primary language and proficiency level by way of user input interface 210. At block 406, control circuitry 204 stores the primary language identifier and proficiency level in storage 208 as part of a user profile, such as the illustrative user profile 500 shown in FIG. 5. For example, control circuitry 204 may store, in storage 208, the viewer's identifier 518 under a user identifier field 502, the viewer's primary language in a primary language field 506, and the viewer's primary language proficiency level in a proficiency level field 508. The viewer's user profile 518 may be one of multiple user profiles 518, 520, 522 stored in storage 208 for multiple viewers, respectively.

At block 408, control circuitry 204 determines whether the viewer has proficiency in any additional languages, such as a secondary language, a tertiary language, or the like. For example, as part of a user profile creation process, control circuitry 204 may present the viewer with an option, by way of user input interface 210, to input all languages and proficiency levels for languages in which the viewer has proficiency.

If control circuitry 204 determines that the viewer has proficiency in an additional language ("YES" at block 408), then at block 410, control circuitry 204 receives an identifier of a secondary language (or a tertiary language) for the viewer and the viewer's proficiency level in that secondary language (or tertiary language). At block 412, control circuitry 204 stores, in storage 208, the secondary language identifier under the secondary language field 510 and the secondary proficiency level under the secondary proficiency level field 512, as part of the profile 518 for that viewer. For a tertiary language, at block 412, control circuitry 204 stores, in storage 208, the tertiary language identifier under the tertiary language field 514 and the tertiary proficiency level under the secondary proficiency level field 516, as part of the profile 518 for that viewer. In some examples, the viewer's proficiency levels in the secondary and tertiary languages are inferior to the viewer's proficiency level in their primary language.

After block 412, or if control circuitry 204 determines that the viewer does not have proficiency in any additional language ("NO" at block 408), then at block 414, control circuitry 204 retrieves from the viewer's digital calendar meeting information, such as a number of meetings the viewer had scheduled for the present day. The term "meeting" generally should be understood to mean an event with a start time and an end time indicated in the viewer's digital calendar. However, in using the retrieved meeting information as the basis upon which to determine whether the viewer had a busy day of meetings (block 802 of FIG. 8), control circuitry 204 may use the subset of the meetings, if any, that were retrieved from the digital calendar and that satisfy certain criteria. Example types of such criteria may include criteria based on a number of attendees of the meeting (e.g., only counting meetings having two or more attendees), a duration of the meeting (e.g., only counting meetings lasting longer than a particular duration), a type of the meeting (e.g., only counting work meetings, not recreational meetings), and/or the like. Accordingly, in some aspects, the meeting information retrieved at block 414 may not only include a number of meetings in the digital calendar, but also other information, such as the individual or collective durations of meetings in the digital calendar, the number of attendees of the meetings in the digital calendar, the types of the meetings (e.g., work meetings or recreational meetings, as may be determined by control circuitry 204 based on the subject line of the meeting and one or more predetermined rules) in the digital calendar, and/or the like. As part of the process of block 414, control circuitry 204 may process the retrieved meeting information to determine which of the meetings retrieved from the digital calendar, if any, satisfy the criteria and thus should be counted as a meeting for the purposes of determining whether the viewer had a busy day of meetings. In this regard, the number of meetings referenced in block 802 of FIG. 8 (described below) may refer to the number, if any, of meetings retrieved from the calendar that satisfy the criteria and exceed the threshold. The viewer's digital calendar may be stored in storage 208, and control circuitry 204 can retrieve the digital calendar from storage at block 414. Additionally or alternatively, the viewer may link their digital calendar to user equipment device 200 and/or user equipment system 201 to enable retrieval of the digital calendar by way of a communications network, such as communications network 314. At block 416, control circuitry 204 stores, in storage 208, under the number of meetings field 504, the number of meetings that the viewer had scheduled for the present day and that satisfy the criteria mentioned above, if any, as part of the user profile 518.

At block 418, control circuitry 204 determines whether to generate a profile of an additional user. For example, as part of the user profile creation process, control circuitry 204 may present the viewer with an option, by way of user input interface 210, to generate a user profile for an additional viewer, such as an additional household member. If control circuitry 204 determines that a profile of an additional user is to be generated ("YES" at block 418), then control circuitry 204 repeats the processes of block 402 through 416 for another viewer, in the manner described above. If, on the other hand, control circuitry 204 determines that no profile of an additional user is to be generated ("NO" at block 418), then the process 400 terminates.

Figure 6:
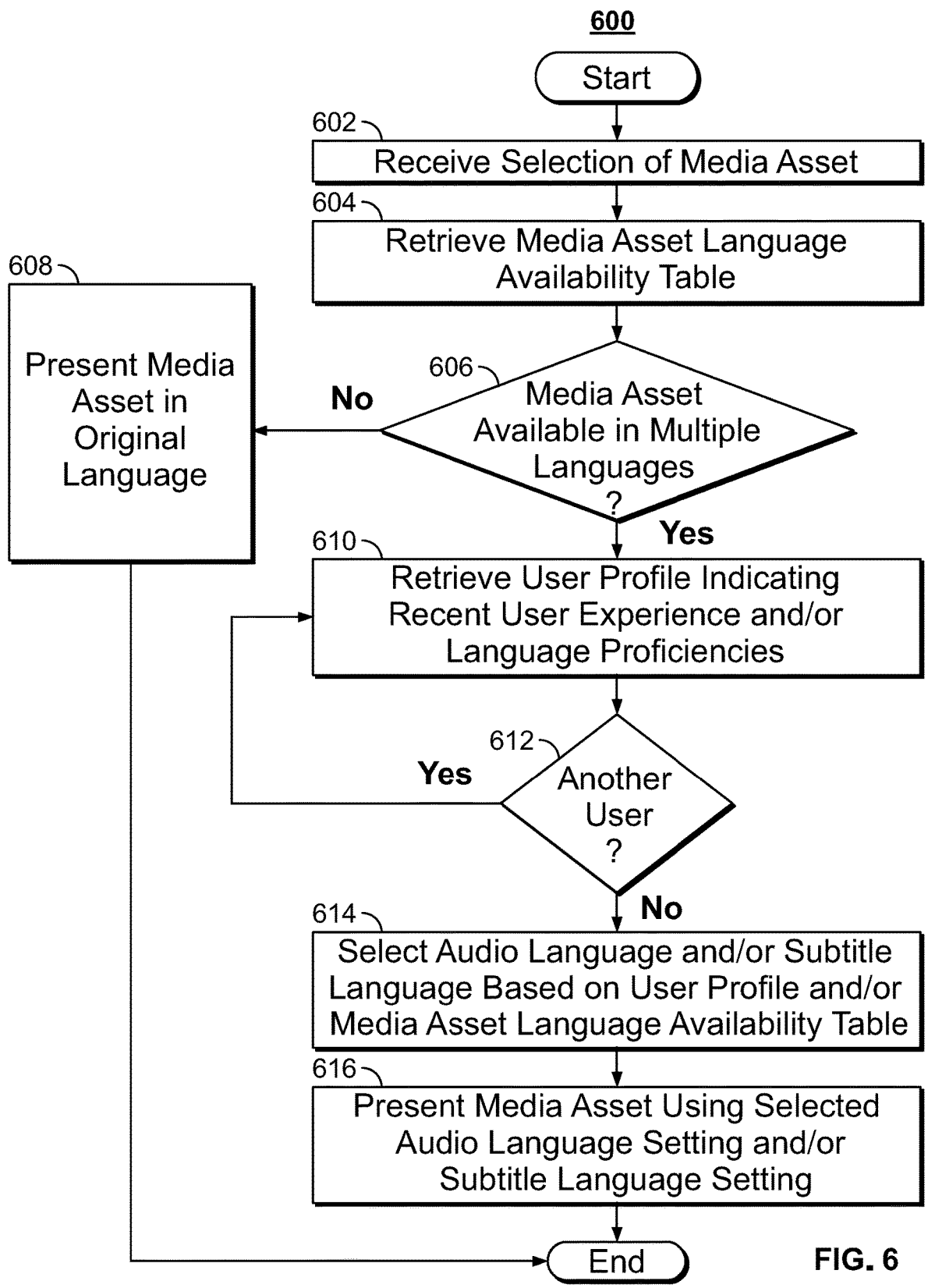
FIG. 6 shows an illustrative flowchart of a process for automatically determining language settings for a media asset, in accordance with some embodiments of the disclosure.

FIG. 6 shows an illustrative flowchart of a process 600 for automatically determining language settings for a media asset, in accordance with some embodiments of the disclosure. At block 602, control circuitry 204 receives a selection of a media asset by way of user input interface 210. For example, the viewer may select, by way of user input interface 210, a particular media asset to be viewed by way of the display 212.

At block 604, control circuitry 204 retrieves, from storage 208 or from an online source, such as media guidance source 318, a media asset language availability table, such as the illustrative media asset language availability table 700 shown in FIG. 7. At block 606, control circuitry 204 determines based on the table 700 retrieved at block 604, whether the media asset selected at block 602 is available to be presented in multiple languages, such as audio languages, subtitle languages, dubbing languages, and/or the like. The table 700 includes, for each media asset, such as media asset 712, 714, or 716, a corresponding media asset identifier (field 702), one or more audio languages in which the media asset is available to be presented (field 704), one or more dubbing languages in which the media asset is available to be presented (field 706), one or more mirror dubbing languages in which the media asset is available to be presented (field 708), and one or more subtitle languages in which the media asset is available to be presented (field 710).

If control circuitry 204 determines that the selected media asset is not available to be presented in multiple languages ("NO" at block 606), then at block 608, control circuitry 204 causes the media asset to be presented in the original language of the media asset, which in most cases is the viewer's primary language. If, on the other hand, control circuitry 204 determines that the selected media asset is available to be presented in multiple languages ("YES" at block 606), then at block 610, control circuitry 204 retrieves, from storage 208, the logged-in viewer's user profile, such as the user profile 518, or more particularly, the data stored in the profile, such as recent user experience data stored in field 504 and/or language proficiency data stored in fields 506, 508, 510, 512, 514, or 516.

At block 612, control circuitry 204 determines whether to retrieve any profiles of additional viewers. For example, control circuitry 204 may determine whether to retrieve an additional profile by determining whether multiple viewers are logged in to user equipment device 200 or user equipment system 201, or whether multiple viewers are indicated in the user profile 518 as being members of a common household. If control circuitry 204 determines that an additional profile is to be retrieved ("YES" at block 612), then control circuitry 204 repeats the process of block 610 to retrieve, from storage 208, the user profile for the additional viewer, such as the user profile 520. If, on the other hand, control circuitry 204 determines that no additional profile is to be retrieved ("NO" at block 612), then control passes to block 614.

At block 614, control circuitry 204 selects one or more languages (e.g., an audio language, a subtitle language, a dubbing language, and/or the like) based on the user profile retrieved at block 610 (or more particularly, the recent user experience data (field 504) and/or language proficiency data (fields 506, 508, 510, 512, 514, and/or 516) within the retrieved user profile), and/or based on the media asset language availability table retrieved at block 604. Additional details regarding how control circuitry 204 may select one or more languages at block 614 are provided below in connection with the process 800 of FIG. 8. At block 616, control circuitry 204 causes the media asset to be presented, by way of display 212, using the language(s) selected at block 614.

Figure 8:
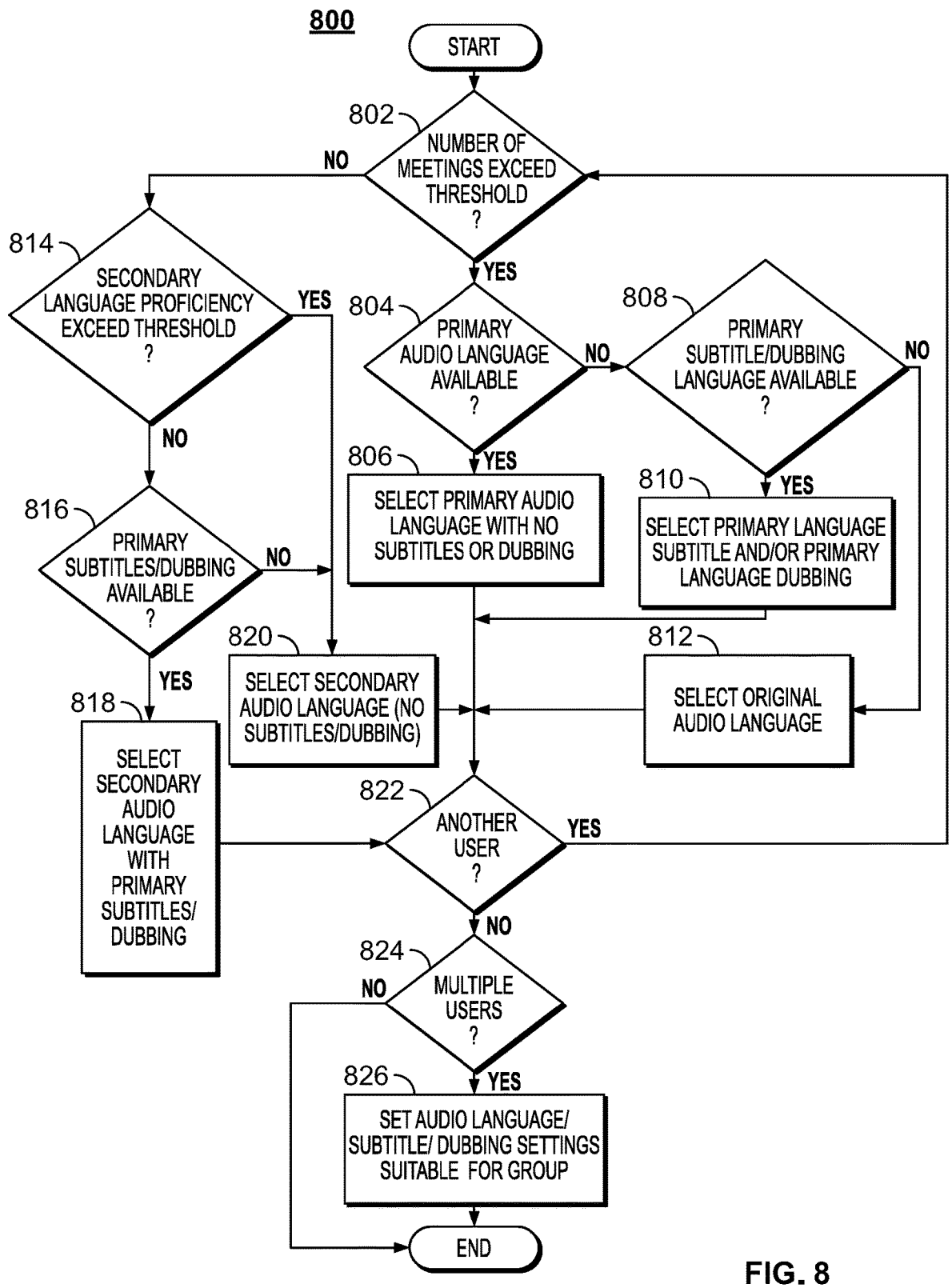
FIG. 8 depicts an illustrative flowchart of a process for selecting language settings based on a recent user experience and/or language proficiencies, in accordance with some embodiments of the disclosure.

FIG. 8 depicts an illustrative flowchart of a process 800 for selecting language settings based on a recent user experience and/or language proficiencies, such as at block 614 of process 600 (FIG. 6), in accordance with some embodiments of the disclosure. With reference to both FIG. 8 and FIG. 6, at block 802, control circuitry 204 determines whether the number of meetings the viewer had scheduled today that satisfy one or more criteria (as discussed above in connection with block 414 of FIG. 4), as retrieved at block 610 (FIG. 6), exceeds a threshold. For example, control circuitry 204 may store the criteria (if any) and a predetermined threshold in storage 208 and use that criteria and threshold for the determination at block 802. The criteria and/or threshold may be system-defined (e.g., default) or may be user-defined and adjustable. In some examples, only work meetings count toward the number of meetings at block 802. In this manner, if the viewer's calendar includes meeting entries for recreational activities (e.g., a round of golf, a spa visit), control circuitry 204 may exclude those meeting from processing at block 802. Additionally or alternatively, although not indicated in FIG. 8, in some embodiments, instead of using the number of meetings, control circuitry 204 may determine at block 802 whether the cumulative duration of meetings that satisfy the criteria exceed the threshold. In this manner, if the viewer had one work meeting that lasted for a duration that exceeds a threshold, control circuitry 204 may conclude that the viewer had a busy day of meetings ("YES" at block 802). If the viewer had multiple work meetings that collectively add up to a duration below the threshold, then control circuitry 204 may conclude that the viewer did not have a busy day of meetings ("NO" at block 802). If control circuitry 204 determines that the number of meetings the viewer had scheduled today (e.g., taking into account any other criteria as discussed above) exceeds the threshold ("YES" at block 802), then control passes to block 804. If, on the other hand, control circuitry 204 determines that the number of meetings the viewer had scheduled today does not exceed the threshold ("NO" at block 802), then control passes to block 814.

At block 804, control circuitry 204 determines whether the media asset selected at block 602 (FIG. 6) is available with the viewer's primary language as the audio language. For example, control circuitry 204 may make the determination at block 804 by reading the viewer's primary language identifier from field 506 of the user profile 518 obtained at block 610 (FIG. 6) and determining whether the audio languages field 704 of the media asset language availability table 700 for the selected media asset (e.g., media asset 712) obtained at block 602 (FIG. 6) includes that primary audio language. If control circuitry 204 determines that the media asset selected at block 602 (FIG. 6) is available in the viewer's primary audio language ("YES" at block 804), then at block 806 control circuitry 204 selects to present the media asset using the primary audio language with no subtitles or dubbing. If, on the other hand, control circuitry 204 determines that the media asset selected at block 602 (FIG. 6) is unavailable in the viewer's primary audio language ("NO" at block 804), then control passes to block 808.

At block 808, control circuitry 204 determines whether the media asset selected at block 602 (FIG. 6) is available with subtitles in the viewer's primary language. For example, control circuitry 204 may make the determination at block 808 by reading the viewer's primary language identifier from field 506 of the user profile 518 obtained at block 610 (FIG. 6) and determining whether the subtitle languages field 710 of the media asset language availability table 700 for the selected media asset (e.g., media asset 712) obtained at block 602 (FIG. 6) includes that primary audio language. If control circuitry 204 determines that the media asset selected at block 602 (FIG. 6) is available with subtitles in the viewer's primary audio language ("YES" at block 808), then at block 810 control circuitry 204 selects to present the media asset using the primary language for the subtitles. If, on the other hand, control circuitry 204 determines that the media asset selected at block 602 (FIG. 6) is unavailable with subtitles in the viewer's primary language ("NO" at block 808), then at block 812 control circuitry 204 selects to present the media asset in its original audio language with no subtitles.

At block 814, after determining that the number of meetings the viewer had that day does not exceed the threshold ("NO" at block 802), control circuitry 204 determines whether the viewer's proficiency in their secondary language exceeds a proficiency threshold. For example, control circuitry 204 may make the determination at block 814 by reading the viewer's secondary language proficiency level from field 512 of the user profile 518 obtained at block 610 (FIG. 6) and comparing the proficiency level to the proficiency threshold, which may be stored in storage 208. If control circuitry 204 determines that the viewer's proficiency in their secondary language exceeds the proficiency threshold ("YES" at block 814), which may indicate that the user's secondary language proficiency is high enough for them to enjoy consuming the media asset in that secondary language, then at block 820 control circuitry 204 selects to present the media asset using the secondary language for the audio language with no subtitles or dubbing. If, on the other hand, control circuitry 204 determines that the viewer's proficiency in their secondary language does not exceed the proficiency threshold ("NO" at block 814), then control passes to block 816.

At block 816, control circuitry 204 determines whether the media asset selected at block 602 (FIG. 6) is available with subtitles and/or dubbing in the viewer's primary language. For example, control circuitry 204 may make the determination at block 816 by reading the viewer's primary language identifier from field 506 of the user profile 518 obtained at block 610 (FIG. 6) and determining whether the subtitle languages field 710 and/or the dubbing fields 706, 708 of the media asset language availability table 700 for the selected media asset (e.g., media asset 712) obtained at block 602 (FIG. 6) includes that primary audio language. If control circuitry 204 determines that the media asset is available with subtitles and/or dubbing in the viewer's primary audio language ("YES" at block 816), then at block 818 control circuitry 204 selects to present the media asset using the viewer's secondary language as the audio language and the viewer's primary language as the subtitle language and/or the dubbing language. If, on the other hand, control circuitry 204 determines that the media asset is unavailable with subtitles and/or dubbing in the viewer's primary language ("NO" at block 816), then at block 820 control circuitry 204 selects to present the media asset with the secondary language as the audio language and with no subtitles or dubbing. In some examples, at block 816, control circuitry 204 may also compare the viewer's proficiency level in their secondary language to the proficiency threshold to determine the difference between the two. In such an example, control circuitry 204 may enable subtitles and/or dubbing (e.g., as at block 818) in the viewer's primary language only if the difference between the viewer's secondary language and the proficiency threshold exceeds another threshold (e.g., if the viewer's proficiency in the secondary language is sufficiently weak). Otherwise, control circuitry 204 (e.g., as at block 820) would not enable the subtitles and/or dubbing in the viewer's primary language.

After block 810, 812, 818, or 820, control passes to block 822. At block 822, control circuitry 204 determines whether there is an additional viewer of the media asset. For example, control circuitry 204 may make the determination at block 822 by determining whether multiple viewers are logged into user equipment device 200 or user equipment system 201, or whether multiple viewers are indicated in the user profile 518 as being members of a common household, or by detecting an input provided by way of user input interface 210. If control circuitry 204 determines that there is an additional viewer of the media asset ("YES" at block 822), then control circuitry 204 repeats the process of block 802 to determine whether the number of meetings the additional viewer had scheduled today, as retrieved at block 610 (FIG. 6), exceeds the threshold. If, on the other hand, control circuitry 204 determines that there is no additional viewer of the media asset ("NO" at block 822), then control passes to block 824.

At block 824, control circuitry 204 determines, based on a flag stored in storage 208 for instance, whether the processes of blocks 802 through 822 have been completed for one viewer or for multiple viewers desiring to view the media asset presently selected at block 602 (FIG. 6) by way of user equipment device 200 and/or user equipment system 201. If control circuitry 204 determines that the processes of blocks 802 through 822 have not been completed for multiple viewers but rather have only been completed for a single viewer ("NO" at block 824), then the process 800 ends. If, on the other hand, control circuitry 204 determines that the processes of block 802 through 822 have been completed for multiple viewers ("YES" at block 824), then at block 826 control circuitry 204 sets the audio language, subtitle language, and/or dubbing language that is most suitable for the group of viewers, based on selections for each of the viewers selected during their respective executions of the processes of block 802 through 822. For example, if the first viewer had a number of scheduled meetings that does not exceed the threshold but the second viewer had a number of scheduled meetings that exceeds the threshold, control circuitry 204 may select the primary language shared in common among the first and second viewers as the audio language, subtitle language, and/or dubbing language in which to present the media asset. In this manner, even if one user might be willing to consume content in their secondary language, if any member of the viewing group would prefer to consume content in their primary language, the primary language is selected for the collective benefit of the group.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically determining language settings for a media asset, the method comprising:
   receiving a selection of a media asset;
   determining whether the media asset is available to be presented in a plurality of audio languages and subtitle languages;
   in response to determining that the media asset is available to be presented in a plurality of audio languages and subtitle languages:
   retrieving a first profile indicating a first recent experience, wherein the first recent experience is based on a first number of meetings scheduled within a time period;
   based on the first recent experience, selecting an audio language and subtitle language for presentation of the media asset; and
   presenting the media asset with the selected audio language and subtitle language.

2. The method of claim 1, wherein the first profile further indicates a first proficiency level in a primary language and a second proficiency level in a secondary language, the second proficiency level being inferior to the first proficiency level, and wherein the selecting the audio language and subtitle language is further based on the first proficiency level and the second proficiency level.

3. The method of claim 2, wherein the selecting the audio language and subtitle language based on the first recent experience, the first proficiency level, and the second proficiency level includes:
   determining whether the first number of meetings scheduled within the time period exceeds a threshold; and
   in response to determining that the first number of meetings scheduled within the time period exceeds the threshold:
   selecting, as the selected audio language and subtitle language, an audio language based on the primary language or a subtitle language based on the primary language.

4. The method of claim 3, wherein the audio language based on the primary language includes an audio dubbing language based on the primary language or an audio mirror dubbing language based on the primary language.

5. The method of claim 2, wherein the selecting the audio language and subtitle language based on the first recent experience, the first proficiency level, and the second proficiency level includes:
   determining whether the first number of meetings scheduled within the time period exceeds a threshold; and
   in response to determining that the first number of meetings scheduled within the time period does not exceed the threshold:
   selecting, as the selected audio language and subtitle language, an audio language based on the secondary language or a subtitle language based on the secondary language.

6. The method of claim 2, wherein the selecting the audio language and subtitle language based on the first recent experience, the first proficiency level, and the second proficiency level includes:
   determining whether the first number of meetings scheduled within the time period exceeds a meeting threshold; and
   in response to determining that the first number of meetings scheduled within the time period does not exceed the meeting threshold:
   determining whether the second proficiency level exceeds a proficiency threshold; and
   in response to determining that the second proficiency level does not exceed the proficiency threshold:
   selecting, as the selected audio language and subtitle language, an audio language based on the secondary language and a subtitle language based on the primary language.

7. The method of claim 2, wherein the method further comprises:
   in response to determining that the media asset is available to be presented in a plurality of audio languages and subtitle languages:
   retrieving a second profile indicating a second recent experience, wherein the second recent experience is based on a second number of meetings scheduled within the time period,
   wherein the second profile further indicates a second proficiency level in the secondary language, and
   wherein the selecting the audio language and subtitle language for presentation of the media asset is further based on the second recent experience and the second proficiency level in the secondary language.

8. The method of claim 7, wherein the selecting the audio language and subtitle language includes:
   determining whether the second number of meetings scheduled within the time period exceeds the threshold; and
   in response to determining that the first number of meetings scheduled within the time period does not exceed the threshold and the second number of meetings scheduled within the time period exceeds the threshold:
   selecting, as the selected audio language and subtitle language, an audio language based on the primary language or a subtitle language based on the primary language.

9. The method of claim 2, wherein the selecting the audio language and subtitle language based on the first recent experience, the first proficiency level, and the second proficiency level includes:
   determining whether the first number of meetings scheduled within the time period exceeds a meeting threshold; and
   in response to determining that the first number of meetings scheduled within the time period does not exceed the meeting threshold:
   determining whether the second proficiency level exceeds a proficiency threshold; and
   in response to determining that the second proficiency level does not exceed the proficiency threshold:
   determining a difference between the second proficiency level and the proficiency threshold;
   selecting, as the selected audio language, an audio language that is based on the secondary language; and
   selecting, as the selected subtitle language, a subtitle language that is based on the difference between the second proficiency level and the proficiency threshold.

10. The method of claim 1, further comprising:
  determining the first number of meetings scheduled within the time period based on a software calendar; and
  storing the first number of meetings scheduled within the time period in the first profile indicating the first recent experience.

11. A system for automatically determining language settings for a media asset, the method comprising:
  a memory configured to store a first profile indicating a first recent experience based on a first number of meetings scheduled within a time period; and
  control circuitry configured to:
  receive a selection of a media asset;
  determine whether the media asset is available to be presented in a plurality of audio languages and subtitle languages;
  in response to determining that the media asset is available to be presented in a plurality of audio languages and subtitle languages:
  retrieve the first profile from the memory;
  based on the first recent experience, select an audio language and subtitle language for presentation of the media asset; and
  present the media asset with the selected audio language and subtitle language.

12. The system of claim 11, wherein the first profile further indicates a first proficiency level in a primary language and a second proficiency level in a secondary language, the second proficiency level being inferior to the first proficiency level, and wherein the control circuitry is configured to select the audio language and subtitle language based on the first proficiency level and the second proficiency level.

13. The system of claim 12, wherein the control circuitry is configured to select the audio language and subtitle language based on the first recent experience, the first proficiency level, and the second proficiency level by:
  determining whether the first number of meetings scheduled within the time period exceeds a threshold; and
  in response to determining that the first number of meetings scheduled within the time period exceeds the threshold:
  selecting, as the selected audio language and subtitle language, an audio language based on the primary language or a subtitle language based on the primary language.

14. The system of claim 13, wherein the audio language based on the primary language includes an audio dubbing language based on the primary language or an audio mirror dubbing language based on the primary language.

15. The system of claim 12, wherein the control circuitry is configured to select the audio language and subtitle language based on the first recent experience, the first proficiency level, and the second proficiency level by:
  determining whether the first number of meetings scheduled within the time period exceeds a threshold; and
  in response to determining that the first number of meetings scheduled within the time period does not exceed the threshold:
  selecting, as the selected audio language and subtitle language, an audio language based on the secondary language or a subtitle language based on the secondary language.

16. The system of claim 12, wherein the control circuitry is configured to select the audio language and subtitle language based on the first recent experience, the first proficiency level, and the second proficiency level by:
  determining whether the first number of meetings scheduled within the time period exceeds a meeting threshold; and
  in response to determining that the first number of meetings scheduled within the time period does not exceed the meeting threshold:
  determining whether the second proficiency level exceeds a proficiency threshold; and
  in response to determining that the second proficiency level does not exceed the proficiency threshold:
  selecting, as the selected audio language and subtitle language, an audio language based on the secondary language and a subtitle language based on the primary language.

17. The system of claim 12,
  wherein the memory is further configured to store a second profile indicating a second recent experience based on a second number of meetings scheduled within the time period, and
  wherein the control circuitry is further configured to:
  in response to determining that the media asset is available to be presented in a plurality of audio languages and subtitle languages:
  retrieve the second profile from the memory,
  wherein the second profile further indicates a second proficiency level in the secondary language, and
  wherein the selecting the audio language and subtitle language for presentation of the media asset is further based on the second recent experience and the second proficiency level in the secondary language.

18. The system of claim 17, wherein the control circuitry is configured to select the audio language and subtitle language by:
  determining whether the second number of meetings scheduled within the time period exceeds the threshold; and
  in response to determining that the first number of meetings scheduled within the time period does not exceed the threshold and the second number of meetings scheduled within the time period exceeds the threshold:
  selecting, as the selected audio language and subtitle language, an audio language based on the primary language or a subtitle language based on the primary language.

19. The system of claim 12, wherein the control circuitry is configured to select the audio language and subtitle language based on the first recent experience, the first proficiency level, and the second proficiency level by:
  determining whether the first number of meetings scheduled within the time period exceeds a meeting threshold; and
  in response to determining that the first number of meetings scheduled within the time period does not exceed the meeting threshold:
  determining whether the second proficiency level exceeds a proficiency threshold; and
  in response to determining that the second proficiency level does not exceed the proficiency threshold:
  determining a difference between the second proficiency level and the proficiency threshold;
  selecting, as the selected audio language, an audio language that is based on the secondary language; and
  selecting, as the selected subtitle language, a subtitle language that is based on the difference between the second proficiency level and the proficiency threshold.

20. The system of claim 11, wherein the control circuitry is further configured to:
    determine the first number of meetings scheduled within the time period based on a software calendar; and
    store, in the memory, the first number of meetings scheduled within the time period in the first profile indicating the first recent experience.

* * * * *